(12) United States Patent
Xiao

(10) Patent No.: US 11,687,942 B2
(45) Date of Patent: Jun. 27, 2023

(54) METHOD AND APPARATUS FOR PROCESSING ACCOUNT OF BLOCKCHAIN NETWORK, AND STORAGE MEDIUM

(71) Applicant: BAIDU ONLINE NETWORK TECHNOLOGY (BEIJING) CO., LTD., Beijing (CN)

(72) Inventor: Wei Xiao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/771,591

(22) PCT Filed: May 20, 2019

(86) PCT No.: PCT/CN2019/087575
§ 371 (c)(1),
(2) Date: Jun. 10, 2020

(87) PCT Pub. No.: WO2020/015448
PCT Pub. Date: Jan. 23, 2020

(65) Prior Publication Data
US 2021/0365939 A1 Nov. 25, 2021

(30) Foreign Application Priority Data
Jul. 18, 2018 (CN) .......................... 201810790459.4

(51) Int. Cl.
*G06Q 20/38* (2012.01)
*G06Q 20/40* (2012.01)

(52) U.S. Cl.
CPC ....... *G06Q 20/405* (2013.01); *G06Q 20/3827* (2013.01); *G06Q 20/38215* (2013.01); *G06Q 20/4014* (2013.01); *H04L 2209/56* (2013.01)

(58) Field of Classification Search
None
See application file for complete search history.

(56) References Cited

U.S. PATENT DOCUMENTS 9,569,253 B1 * 2/2017 Hsieh .................. G06F 16/2379
9,608,829 B2 * 3/2017 Spanos ................. H04L 9/3242
(Continued)

FOREIGN PATENT DOCUMENTS

| CN | 106408299 A | 2/2017 |
| CN | 106779708 A | 5/2017 |

(Continued)

OTHER PUBLICATIONS

Ethereum Homestead, "Account Types, Gas, and Transactions," www.ethdocs.org, all pages. (Year: 2016).*
(Continued)

*Primary Examiner* — Jacob C. Coppola
(74) *Attorney, Agent, or Firm* — Cozen O'Connor

(57) ABSTRACT

Disclosed are a method and apparatus for processing an account of a blockchain network. The method includes: obtaining an account transaction request associated with a chain account, wherein, the chain account belongs to the blockchain; obtaining an account smart contract from the account transaction request, and writing the account smart contract into a block, wherein, the account smart contract is configured to perform operation on a chain element in the chain account when executed.

18 Claims, 2 Drawing Sheets request obtaining module — S310 contract writing module — S320

(56) References Cited

U.S. PATENT DOCUMENTS

| | | | |
|---|---|---|---|
| 11,030,681 B2* | 6/2021 | Bathen | G06Q 40/00 |
| 11,139,979 B2* | 10/2021 | van de Ruit | H04L 9/12 |
| 2016/0028552 A1* | 1/2016 | Spanos | H04L 9/3236 |
| | | | 713/178 |
| 2016/0224949 A1* | 8/2016 | Thomas | G06Q 20/02 |
| 2016/0330034 A1* | 11/2016 | Back | H04L 9/3255 |
| 2017/0232300 A1* | 8/2017 | Tran | A63B 71/06 |
| | | | 434/247 |
| 2017/0331896 A1* | 11/2017 | Holloway | H04L 9/12 |
| 2017/0352027 A1* | 12/2017 | Zhang | G06Q 20/065 |
| 2018/0025435 A1* | 1/2018 | Karame | H04L 9/3236 |
| | | | 705/30 |
| 2018/0040007 A1* | 2/2018 | Lane | G06Q 50/01 |
| 2018/0341930 A1* | 11/2018 | Moir | H04L 9/3247 |
| 2018/0349621 A1* | 12/2018 | Schvey | G09C 1/00 |
| 2019/0081789 A1* | 3/2019 | Madisetti | G06Q 20/401 |
| 2019/0081793 A1* | 3/2019 | Martino | G06Q 20/065 |
| 2019/0207762 A1* | 7/2019 | Xie | H04L 12/4641 |
| 2020/0134066 A1* | 4/2020 | Yegorin | H04L 9/3239 |

FOREIGN PATENT DOCUMENTS

| | | |
|---|---|---|
| CN | 106899698 A | 6/2017 |
| CN | 106919419 A | 7/2017 |
| CN | 106920098 A | 7/2017 |
| CN | 107329888 A | 11/2017 |
| CN | 108012582 A | 5/2018 |
| CN | 108074081 A | 5/2018 |
| CN | 108173850 A | 6/2018 |
| CN | 108292331 A | 7/2018 |
| CN | 109063049 A | 12/2018 |
| EP | 3499789 A1 * | 6/2019 ........... H04L 9/3236 |
| TW | 201816654 A | 5/2018 |
| WO | WO-2015077378 A1 * | 5/2015 ......... G06Q 20/0655 |
| WO | WO-2016015041 A1 * | 1/2016 ........... H04L 9/3268 |
| WO | WO 2018111295 A1 | 6/2018 |
| WO | WO-2018145024 A1 * | 8/2018 ....... G06F 17/30283 |
| WO | WO-2019195639 A1 * | 10/2019 ............. G06Q 30/06 |
| WO | WO-2019204898 A1 * | 10/2019 |

OTHER PUBLICATIONS

Chinese Patent Application No. 201810790459.4 Office Action dated Dec. 10, 2019, 6 pages.
Chinese Patent Application No. 201810790459.4 English translation of Office Action dated Dec. 10, 2019, 8 pages.
PCT/CN2019/087575 International Search Report dated Jul. 31, 2019, 5 pages.
PCT/CN2019/087575 English translation of International Search Report dated Jul. 31, 2019, 6 pages.
Japanese Patent Application No. 2020-532960 Office Action dated Sep. 28, 2021, 4 pages.
Japanese Patent Application No. 2020-532960 English translation of Office Action dated Sep. 28, 2021, 4 pages.
Chinese Patent Application No. 201810790459.4 Notice of Allowance dated Nov. 5, 2021, 4 pages.
Chinese Patent Application No. 201810790459.4 English translation of Notice of Allowance dated Nov. 5, 2021, 4 pages.
"Design And Implementation Of Voting System Based On Blockchain Technology", Jun. 2017; Thesis, 75 pages.

* cited by examiner

METHOD AND APPARATUS FOR PROCESSING ACCOUNT OF BLOCKCHAIN NETWORK, AND STORAGE MEDIUM

CROSS-REFERENCE TO RELATED APPLICATIONS

This application is a US national phase application of International Application No. PCT/CN2019/087575, filed on May 20, 2019, which is based upon and claims priority to Chinese Patent Application No. 201810790459.4, filed on Jul. 18, 2018, the entire contents of which are incorporated herein by reference.

FIELD

Embodiments of the present disclosure relate to a field of blockchain technologies, for example, relate to a method and apparatus for processing an account of a blockchain network, and a storage medium.

BACKGROUND

An existing blockchain network may be roughly divided into three types according to a node size, a consensus mechanism and an operation scene of the existing blockchain network, that is, a public chain, an alliance chain and a private chain. Each type of blockchain networks is used to generate, store, and operate an independent blockchain, capable of processing corresponding transaction and storing transaction data into a block. A plurality of nodes participate in the blockchain network on which each blockchain is based. The node is disposed with data required for operating a consensus mechanism, a smart contract, an incentive mechanism, and an encryption algorithm required in the blockchain technology. Generally, for normally operating the blockchain, the node needs to provide a hashrate. Therefore, the node may be rewarded to participating in block processing and storage by issuing and allocating digital cash. Meanwhile, the digital cash may also be an object processed by a transaction request in the blockchain, and is generally stored in an account of the blockchain, typically a blockchain network corresponding to a bitcoin. The bitcoin is not only used as an incentive to a node of a miner, but also participates in respective trading transactions.

With a rapid development of the blockchain technology, the application scene of the blockchain technology is no longer limited to a trading of the digital cash. For example, a user is not satisfied with only operating the transaction in an independent blockchain, or is no longer satisfied with only using the digital cash as the object or medium of the transaction, but generates a requirement to continuously renewing a transaction mode. The blockchain with a conventional type and a function of the account in the blockchain may not meet requirements of a plurality of scenes.

SUMMARY

An overview for the subject matter of the present disclosure will be described in detail below. The overview does not limit the protection scope of the claims.

Embodiments of the present disclosure provide a method and apparatus for processing an account of a blockchain network, and a storage medium.

Embodiments of the present disclosure provide a method for processing an account of a blockchain network, which is executed by a block generation node. The method includes: obtaining an account transaction request associated with a chain account, in which, the chain account belongs to the blockchain; obtaining an account smart contract from the account transaction request, and writing the account smart contract into a block, in which, the account smart contract is configured to perform operation on a chain element in the chain account when executed.

Embodiments of the present disclosure also provide an apparatus for processing an account of a blockchain network, which is configured in a block generation node. The apparatus includes: one or more processors; a memory storing instructions executable by the one or more processors; in which the one or more processors are configured to: obtain an account transaction request associated with a chain account, in which, the chain account belongs to the blockchain; obtain an account smart contract from the account transaction request, and to write the account smart contract into a block, in which, the account smart contract is configured to perform operation on a chain element in the chain account when executed.

Embodiments of the present disclosure also provide a computer readable storage medium having a computer program stored thereon. The computer program is configured to implement a method for processing an account of a blockchain network when executed by a processor, and the method includes: obtaining an account transaction request associated with a chain account, in which, the chain account belongs to the blockchain; obtaining an account smart contract from the account transaction request, and writing the account smart contract into a block, in which, the account smart contract is configured to perform operation on a chain element in the chain account when executed.

DETAILED DESCRIPTION

Detailed description will be further made below to the present disclosure with reference to accompanying drawings and embodiments. It should be understood that, the embodiments described herein are intended only to explain the present disclosure, and are not intended to limit the present disclosure.

In addition, it should be noted that, for convenience of description, the accompanying drawings merely illustrate some but not all of the contents related to the present disclosure. Before exemplary embodiments are discussed in more detail, it should be mentioned that some of the exemplary embodiments are described as processes or methods depicted as flow charts. Although the flow chart describes to process respective operations (or steps) in a sequence, a plurality of operations may be implemented in parallel, concurrently, or simultaneously. In addition, the sequence of respective operations may be rearranged. The process may be terminated when the operation is completed, but may also have additional steps not included in the accompanying drawings. The process may correspond to methods, functions, procedures, subroutines, subprograms, etc.

Embodiment 1

Figure 1:
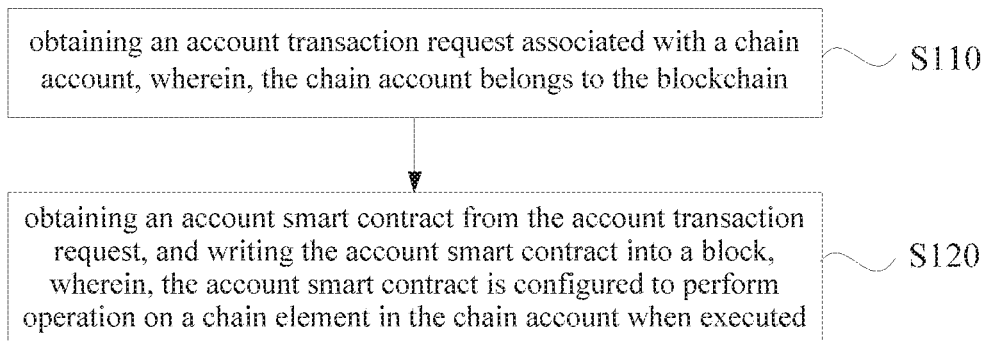
FIG. 1 is a flow chart illustrating a method for processing an account of a blockchain network provided in Embodiment 1 of the present disclosure.

FIG. 1 is a flow chart illustrating a method for processing an account of a blockchain network provided in Embodiment 1 of the present disclosure. This embodiment may be applicable to a case where a block generation node processes the account based on a smart contract. The method may be executed by an apparatus for processing an account of a blockchain network. The apparatus may be implemented in form of software and/or hardware, and integrated in a computer device carrying a function of a node of the blockchain network. The node of the blockchain network may be a block generation node having a block processing permission. As illustrated in FIG. 1, the method includes the following.

At step S110, an account transaction request associated with a chain account is obtained, in which, the chain account belongs to the blockchain.

The chain account may be an account belonging to the blockchain, and may be used to manage a medium used for a transaction in the blockchain, such as digital cash or an element that may be used for the transaction. A difference between the chain account and an account in an existing blockchain network is that the chain account may not be controlled and managed by a user, but an operation of the chain account is specified by a smart contract. The account transaction request may be a transaction request initiated by the node of the blockchain network and used to request to establish the chain account, or may be a transaction request for requesting to change the chain account or to perform element operation in the chain account. The element operation may generally include a transfer-in and transfer-out processing. The account transaction request is used to include or generate an account smart contract that may control the chain account. The account smart contract is written into a block to ensure a reliable execution of the account smart contract.

In this embodiment, the block generation node may be used as a chain account creator to create a chain account in the blockchain network. Correspondingly, the block generation node firstly needs to obtain and to process the account transaction request associated with the chain account. The chain account belongs to the blockchain. The blockchain may be one blockchain or a plurality of blockchains in the blockchain network. The plurality of blockchains in the blockchain network may exist in a parallel chain mode.

It should be noted that an existing blockchain field mainly includes a user account and an alliance account. The user account may be the user's own account, and there is no strict corresponding relationship between the user and the node in the blockchain network. That is, one user may correspond to a plurality of nodes, one node may also carry a plurality of users, and there is no fixed corresponding relationship between the node and the user. The user may manage his/her account data through a public key and a private key of the user, for example, manage the digital cash in the user account. The user may use the digital cash in his/her account to perform any operation such as performing a transaction, paying a commission charge, performing a reward and providing a frozen capital. The alliance account may be an account that is managed and used by a plurality of people in a unified way. If the alliance account wants to perform an operation involving the digital cash, such as the transaction and the reward, the operation for the digital cash of the alliance account may be controlled only when all members of the alliance or a large proportion of members agree. The alliance account may generally be used in an alliance chain and belong to an organization such as a company or an organization. It may be seen that, in the existing blockchain network, the account may generally be managed and controlled by one or more users.

However, when there are two or more blockchains in the blockchain network, such as a plurality of parallel chains, the parallel chain also requires some transactions involving to the digital cash in the account during creating or operating the parallel chain. However, the existing user account or alliance account may not completely match a requirement that the parallel chain operates the digital cash. For example, when the parallel chain is created, the node in the blockchain network is unwilling to participate and to provide a hashrate as it is not sure whether a revenue may be obtained. In order to encourage the node to participate in creating the parallel chain, a creator of the parallel chain may provide a certain amount of digital cash incentive for stimulating. However, the creator of the parallel chain has an absolute control right over his/her own user account or alliance account. Therefore, once the creator of the parallel chain needs to change, or the creator of the parallel chain reneges on the provided incentive, there is no guarantee that the incentive must be in place.

In this embodiment, the chain account may be set in the blockchain network to avoid the absolute control right of the user. The chain account may be used to store chain elements, and the chain account may not be controlled and managed by any user. The chain account is public and transparent without the private key, and an operation for the chain account may only be controlled through the account smart contract bound when the chain account is created. Therefore, the chain account has enough credibility compared with the existing account, which may ensure the effectiveness and reliability of the incentive to the node. The chain account of the blockchain and the account smart contract of the chain account may be written into a block of the blockchain, for example, written into a creation block; and may also be written into a block of other blockchain, and a node of other blockchain supervises an execution of a chain account of another blockchain.

In an embodiment of the present disclosure, obtaining the account transaction request associated with the chain account includes: obtaining a proposal transaction request for creating the chain account, changing the chain account, or operating the chain account; and processing the proposal transaction request, and based on a vote result of other nodes of the blockchain, initiating a transaction request carrying the chain account and the account smart contract for creating the chain account, changing the chain account, or operating the chain account. The account transaction request includes the account smart contract.

The proposal transaction request for creating the chain account may be a transaction request initiated by the node of the blockchain network and used for creating the chain account. The proposal transaction request for changing the chain account may be a transaction request initiated by the node of the blockchain network and used for changing information related to the chain account, for example, changing an account name, etc. The transaction request for operating the chain account may be a transaction request initiated by the node of the blockchain network and used for performing related operations on the chain account, for example, resetting an account output rule, etc. The proposal transaction request is generally applicable to a case where the blockchain of the chain account already exists, and then the chain account is created, changed or operated. The proposal transaction request may determine the account smart contract only when a vote support of other nodes is obtained.

The transaction request for creating the chain account may be a transaction request initiated by the block generation node and used for creating the chain account or the account smart contract of the chain account. The transaction request for changing the chain account may be a transaction request initiated by the block generation node and used for changing information related to the chain account or the account smart contract of the chain account. The transaction request operating the chain account may be a transaction request initiated by the block generation node and used for performing related operation on the chain account or the account smart contract of the chain account.

In this embodiment, when the node in the blockchain network needs to create, change or operate the chain account, a corresponding proposal transaction request may be initiated in the blockchain network. The block generation node may process the proposal transaction request after receiving the proposal transaction request. Exemplarily, the block generation node may process the proposal transaction request in a proposal-vote mode, and receive the vote result of other nodes on relevant contents in the proposal transaction request, to determine whether the proposal transaction request passes. For example, within a deadline for voting, such as 10 minutes, when the block generation node receives the vote result feedback from a set proportion (such as, ⅔) of nodes as approval, it may be determined that subsequent processing is performed on the proposal transaction request. The block generation node may re-initiate a corresponding transaction request in the blockchain network based on specific content of the proposal transaction request, thereby creating, changing or operating the chain account or the account smart contract of the chain account. The block generation node may select and edit a set smart contract module specified in the proposal transaction request, thereby changing the account smart contract; or, the block generation node may also directly generate a new account smart contract meeting a requirement based on the relevant content of the proposal transaction request.

In an embodiment of the present disclosure, an address of the chain account is a natural semantic field.

The natural semantic may include, but be not limited to, a word, a letter, a short sentence, etc. of each type of language, In this embodiment, the chain account is not controlled and managed by the user, so long as the chain account may be recognized by the node. Therefore, there is no need to set a public key address with a fixed-length and a corresponding private key for the chain account, and the address of the chain account may be named using the natural semantic field, such as a readable English word.

At step S120, an account smart contract is obtained from the account transaction request, and the account smart contract is written into a block, in which, the account smart contract is configured to perform operation on a chain element in the chain account when executed.

The account smart contract may be a smart contract for stipulating an execution and operation procedure of the chain account in the blockchain network. The chain element may be media used for transferring in chain account, such as the digital cash or other items.

In this embodiment, when the node of the blockchain network needs to create the chain account, the address of the chain account may be written in the block, and the account smart contract binding the chain account is simultaneously taken as an account transaction request, and issued in the blockchain network. The block generation node may obtain the account smart contract after receiving the account transaction request, and write the obtained account smart contract into the block. During operating the chain account, the block generation node may trace back a historical block to obtain the account smart contract corresponding to the chain account, and perform respective operations on the chain account based on the account smart contract.

With embodiments of the present disclosure, the account transaction request associated with the chain account is obtained, the account smart contract is obtained from the account transaction request, and the account smart contract is written into the block, such that the block generation node may process the chain account based on the rule stipulated in the account smart contract when executing the account smart contract, in which, the chain account belongs to the blockchain. The chain account is operated based on the rule stipulated in the account smart contract without depending on the operation of the user on the chain account, thereby providing a way for the blockchain technology and the account function to adapt to the requirements of respective scenes, and enabling the blockchain network and the account function of the blockchain to match the requirements of the more complex application scenes.

Embodiment 2

Figure 2:
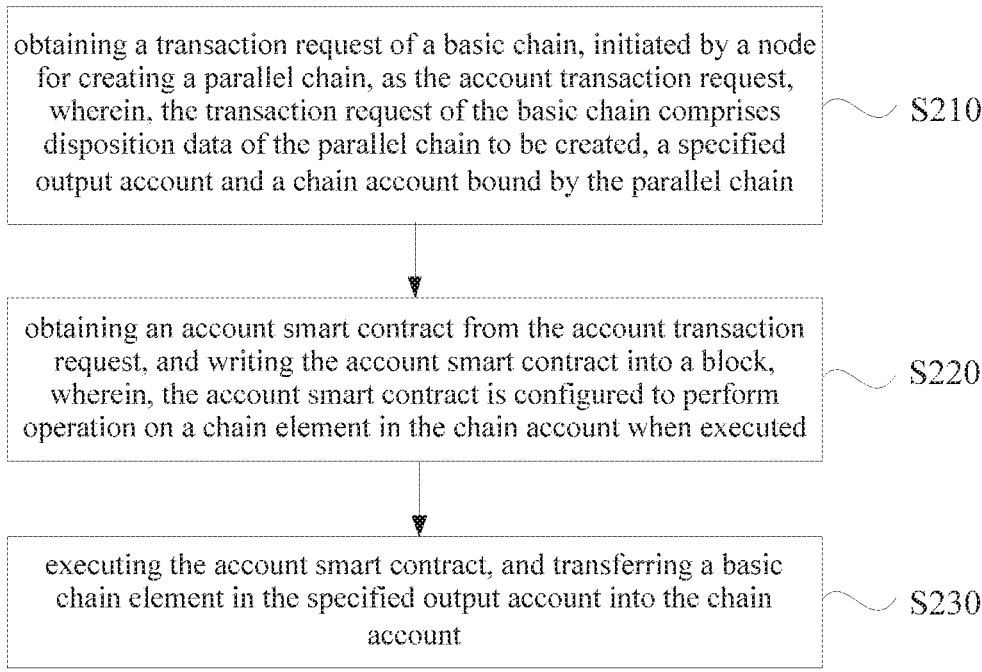
FIG. 2 is a flow chart illustrating a method for processing an account of a blockchain network provided in Embodiment 2 of the present disclosure.

FIG. 2 is a flow chart illustrating a method for processing an account of a blockchain network provided in Embodiment 2 of the present disclosure. This embodiment is embodied on the basis of the above embodiment. In this embodiment, there are illustrated a detailed implementation for obtaining an account transaction request associated with a chain account, and a detailed operation at the same time or after obtaining an account smart contract from the account transaction request and writing the account smart contract into a block. Correspondingly, as illustrate in FIG. 2, the method in this embodiment includes the following.

At step S210, a transaction request of a basic chain, initiated by a node for creating a parallel chain, is obtained as the account transaction request, in which, the transaction request of the basic chain includes disposition data of the parallel chain to be created, a specified output account and a chain account bound by the parallel chain.

The basic chain is a blockchain, and may be used to establish a connection between respective independent blockchains. The basic chain may be associated with a corresponding parallel chain, and used for assisting to create the parallel chain and to manage the parallel chain, and assisting the parallel chain to perform data exchange. For example, the basic chain may be used to establish the connection between the existing independent blockchains, such that data interaction in the blockchain is no longer limited to a single blockchain, and a flow range of a value is no longer limited to the single blockchain. That is, the basic chain may manage and supervise operation parameters in the whole blockchain network. The transaction request of the basic chain may be a transaction request occurring within a time period or other pending transaction request in a basic chain network.

The parallel chain is also a blockchain, which is a relative concept to the basic chain. The parallel chain has all attributes of a common blockchain, and may be established and managed, and perform exchange data based on the basic chain. The parallel chain may be derived from the basic chain, or also have a same status and function as the basic chain, assisting each other in establishing, managing and exchanging data. There may be one or more parallel chains. A plurality of parallel chains may be independent of each other and do not influence each other, or there may also be a relationship of mutually basic chains and parallel chains between two parallel chains. The node for creating the parallel chain may be a network node for creating a creation block of the parallel chain, and also disposed with data of the basic chain, thus the transaction request of the basic chain may be initiated. The disposition data may be data corresponding to a data layer, a network layer, a consensus layer, an incentive layer, a contract layer and an application layer in the blockchain, such as a data block, a timestamp, a propagation mechanism, a verification mechanism, an issuance mechanism, an algorithm mechanism, a smart contract, or a programmable currency. A corresponding account smart contract may also be written in the creation block of the parallel chain for the block generation node in a subsequent parallel chain to execute the account smart contract. The account smart contract in the parallel chain may stipulate that the parallel chain cooperates with the basic chain to jointly operate the chain account. For example, the account smart contract of the parallel chain stipulates that, the network node of the parallel chain initiates the transaction request of the basic chain to the basic chain and requests a node of the basic chain network to process the transaction request when a set condition is satisfied. The transaction request of the basic chain may request the node of the basic chain network to transfer the chain element of the chain account. A specified output account may be an account for outputting the chain element in the chain account to other accounts.

Generally, the basic chain is established and operated before the parallel chain, and has a higher credibility and appeal, and the value of the basic chain is more recognized by the user. Therefore, the node of the parallel chain may use the credibility and appeal of the network node of the basic chain to provide a service for the user with an aid of a node willing to provide a hashrate.

The basic chain and parallel chain may form a super chain network. In the super chain network, there may also be one or more basic chains. It should be noted that, there is an overlapping relationship between all nodes participating in the basic chain and all nodes participating in the parallel chain, that is, at least part of the nodes participating in the parallel chain and at least part of the nodes participating base chain are same network nodes. The overlapping network nodes are disposed with all the data of the blockchain in which the overlapping network nodes participate, that is, not only the disposition data of the basic chain, but also the disposition data of the parallel chain, and the blocks of the basic chain and the parallel chain are stored. Since the data of different blockchains are disposed simultaneously, such network nodes may generate transaction requests of different blockchains, and may also locally query the transaction data in different blockchains, to facilitate a cross-chain transaction processing.

In addition, it should be noted that, the basic chain and the parallel chain may be stimulated by the same or different types of digital cash, and the accounts for storing the digital cash in the network nodes of the basic chain and the parallel chain may simultaneously store a plurality of different types of digital cash, and the digital cash in each blockchain may interact with the account, for example, transferring into or out of the digital cash. An incentive function of the blockchain is not limited to the digital cash, but may also be other elements managed by the account.

In this embodiment, the chain account may be used to establish an association between the basic chain and the parallel chain, that is, the chain account may be used to provide the incentive for the network node participating in the parallel chain. In detail, any of the nodes of the basic chain network may be used as the node for creating the parallel chain to initiate the transaction request of the basic chain for creating the creation block of the parallel chain. That is, the node for creating the parallel chain may take content of the creation block of the parallel chain as the transaction request of the basic chain, to request the node of the basic chain network to write the transaction request into the block of the basic chain. In this way, the basic chain may supervise and trace back the creation block of the parallel chain. The content of the creation block of the parallel chain may be established by referring to the content of the creation block of the existing blockchain, for example, writing the disposition data such as the consensus mechanism and the incentive mechanism of the parallel chain, issued digital cash, and a template of the account smart contract to the creation block of the parallel chain. In addition, a corresponding specified output account and the chain account bound by the parallel chain may also be stipulated in the creation block of the parallel chain. Moreover, the creation block of the parallel chain may control a later operation of the parallel chain. It may be seen that, when creating a parallel chain, the node for creating the parallel chain may stipulate an incentive rule for the nodes participating in establishing the parallel chain in the initiated transaction request of the basic chain.

At step S220, an account smart contract is obtained from the account transaction request, and the account smart contract is written into a block, in which, the account smart contract is configured to perform operation on a chain element in the chain account when executed.

At step S230, the account smart contract is executed, and a basic chain element in the specified output account is transferred into the chain account.

In this embodiment, the basic chain element included in the output account specified in the transaction request of the basic chain is transferred into the chain account, and the chain element in the chain account plays an incentive role with the aid of the value of the basic chain.

In an embodiment of the present disclosure, the account smart contract is configured to perform the operation on the chain element in the chain account when executed, and the operation includes at least one of: inputting the chain element by other account into the chain account; and transferring the chain element in the chain account into other account in the blockchain based on a rule stipulated in the account smart contract.

In this embodiment, the account smart contract may have following functions when executed.

Firstly, an existing account in the blockchain network, such as a user account and an alliance account, inputs an initial number of chain elements to the chain account. When the blockchain network is the super chain network, the account held by the node for creating the parallel chain may generally input the initial number of chain elements into the chain account. The chain element inputted to the chain account may be a chain element already laid out in the basic chain or the parallel chain. In an embodiment, in view of the sufficient credibility of the basic chain, the chain element circulating in the basic chain may be inputted into the chain account, to prevent other nodes from not recognizing the value of the chain element and not playing an incentive role.

During the chain account is operated, the chain element may be transferred from the chain account to other accounts in the blockchain according to the rule stipulated in the account smart contract. Exemplarily, the node for creating the parallel chain may transfer a certain amount of chain elements from the chain account to an account corresponding to the node participating in creating the parallel chain according to the rule in the account smart contract when creating the parallel chain. For example, the setting number of chain elements in the chain account are evenly distributed to the accounts corresponding to the nodes participating in the creating the parallel chain.

In an embodiment of the present disclosure, the rule stipulated in the account smart contract may include at least one of: allocating a setting number of chain elements for a setting number of block generation nodes in historic blocks based on a hashrate contribution rule; and allocating a setting number of chain elements for nodes in the blockchain network based on an average rule.

The setting number may be a value set based on an actual requirement, such as 10, 20 or 50, which is not limited in this embodiment. The hashrate contribution rule may be artificially stipulated, and is used to measure a weight value or an order of nodes providing the hashrate. For example, in the first five block generation nodes, the weight values of the hashrates provided by respective block generation nodes are 0.1, 0.2, 0.3, 0.2 and 0.2, or in the first five block generation nodes, the hashrates provided by respective block generation nodes in a descending order are: a block generation node 1, a block generation node 3, a block generation node 2, a block generation node 5 and a block generation node 4. The setting value may be a value set based on the actual requirement, such as 100 or 200, which needs to be adaptively set according to the total amount of chain elements included in the blockchain, and this embodiment is also not limited thereto. An allocation ratio of chain elements may be set for the nodes of the blockchain network, and is a ratio for allocating a proportion value of chain elements. Generally, during the operation of the blockchain, certain digital cash may be awarded to each block generation node of each block, i.e. allocating the digital cash. Generally, the digital cash may be declined as the number of blocks increases. When the chain elements are allocated, the allocation may be performed with reference to the allocation proportion of the digital cash of the blockchain. An average rule may be a way that all nodes participating in the parallel chain are evenly allocated.

In this embodiment, the rule specified in the account smart contract may include following situations.

First, the setting number of chain elements may be allocated to block generation nodes based on the number of block generation nodes and the hashrate contribution rule. When the blockchain network is the super chain network, the node of the basic chain network may query the block data in the parallel chain stored locally to obtain the information of the block generation node in the parallel chain by executing the account smart contract. Exemplarily, when a bitcoin is taken as the element of the basic chain, and when the number of block generation nodes in a parallel chain network reaches 10, 100 bitcoins may be allocated according to the degree of the hashrates provided by 10 block generation nodes. When the weight values of the hashrates provided by the 10 block generation nodes are 0.05, 0.1, 0.15, 0.1, 0.1, 0.2, 0.05, 0.1, 0.05 and 0.1 respectively, 5, 10, 15, 10, 10, 20, 5, 10, 5 and 10 bitcoins are allocated to the 10 block generation nodes respectively.

Of course, the setting number of chain elements may be directly allocated to the nodes in the blockchain network according to the average rule. Exemplarily, when the blockchain network is the super chain network, and there are 15 nodes in all in the parallel chain, bitcoins in 300 basic chains may be equally allocated to the 15 nodes, and each node is allocated to 20 bitcoins.

It should be noted that, FIG. 2 is merely a schematic diagram of an implementation. There is no sequential relationship between actions at S220 and S230. Actions at S220 may be implemented firstly, then actions at S230 are implemented, or both may be implemented in parallel.

With the above technical solution, the transaction request of the basic chain, initiated by the node for creating the parallel chain, is obtained as the account transaction request, the account smart contract is obtained from the account transaction request, and the account smart contract is written into the block, such that the block generation node may process the chain account based on the rule stipulated in the account smart contract when executing the account smart contract, in which, the chain account belongs to the blockchain. The chain account is operated based on the rule stipulated in the account smart contract without depending on the operation of the user on the chain account, thereby providing a way for the blockchain technology and the account function to adapt to the requirements of respective scenes, and enabling the blockchain network and the account function of the blockchain to match the requirements of the more complex application scenes.

Embodiment 3

Figure 3:
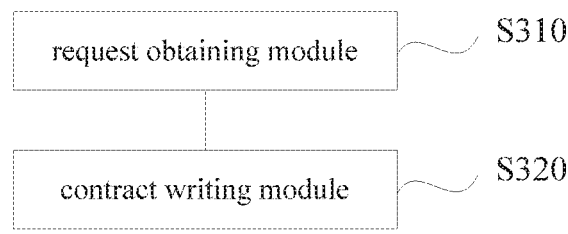
FIG. 3 is a block diagram illustrating an apparatus for processing an account of a blockchain network provided in Embodiment 3 of the present disclosure.

FIG. 3 is a block diagram illustrating an apparatus for processing an account of a blockchain network provided in Embodiment 3 of the present disclosure. As illustrated in FIG. 3, the apparatus is configured in a block generation node, and may include: a request obtaining module 310 and a contract writing module 320.

The request obtaining module 310 is configured to obtain an account transaction request associated with a chain account, in which, the chain account belongs to the blockchain.

The contract writing module 320 is configured to obtain an account smart contract from the account transaction request, and to write the account smart contract into a block, in which, the account smart contract is configured to perform operation on a chain element in the chain account when executed.

With this embodiment, the account transaction request associated with the chain account is obtained, the account smart contract is obtained from the account transaction request, and the account smart contract is written into the block, such that the block generation node may process the chain account based on a rule stipulated in the account smart contract when executing the account smart contract, in which, the chain account belongs to the blockchain. The chain account is operated based on the rule stipulated in the account smart contract without depending on the operation of the user on the chain account, thereby providing a way for the blockchain technology and the account function to adapt to the requirements of respective scenes, and enabling the blockchain network and the account function of the blockchain to match the requirements of the more complex application scenes.

In an embodiment, the request obtaining module 310 is configured to obtain a transaction request of a basic chain, initiated by a node for creating a parallel chain, as the account transaction request, in which, the transaction request of the basic chain includes disposition data of the parallel chain to be created, a specified output account and a chain account bound by the parallel chain.

In an embodiment, the apparatus also includes: an element transferring module, which is configured to execute the account smart contract, and to transfer a basic chain element in the specified output account into the chain account.

In an embodiment, the request obtaining module 310 is configured to obtain a proposal transaction request for creating the chain account, changing the chain account, or operating the chain account; to process the proposal transaction request, and based on a vote result of other nodes of the blockchain, and to initiate a transaction request carrying the chain account and the account smart contract for creating the chain account, changing the chain account, or operating the chain account.

In an embodiment, an address of the chain account is a natural semantic field.

In an embodiment, the account smart contract is configured to perform the operation on the chain element in the chain account when executed, and the operation includes at least one of: inputting the chain element by other account into the chain account; and transferring the chain element in the chain account into other account in the blockchain based on a rule stipulated in the account smart contract.

In an embodiment, the rule stipulated in the account smart contract includes at least one of: allocating a setting number of chain elements for a setting number of block generation nodes in historic blocks based on a hashrate contribution rule; and allocating a setting number of chain elements for nodes in the blockchain network based on an average rule.

The above apparatus for processing the account of the blockchain network may execute the method for processing the account of the blockchain network according to any one of embodiments of the present disclosure, and has function modules and advantageous effects corresponding to the execution method. Technical details not described in detail in this embodiment may refer to the method for processing the account of the blockchain network provided in any one of embodiments of the present disclosure.

Embodiment 4

Figure 4:
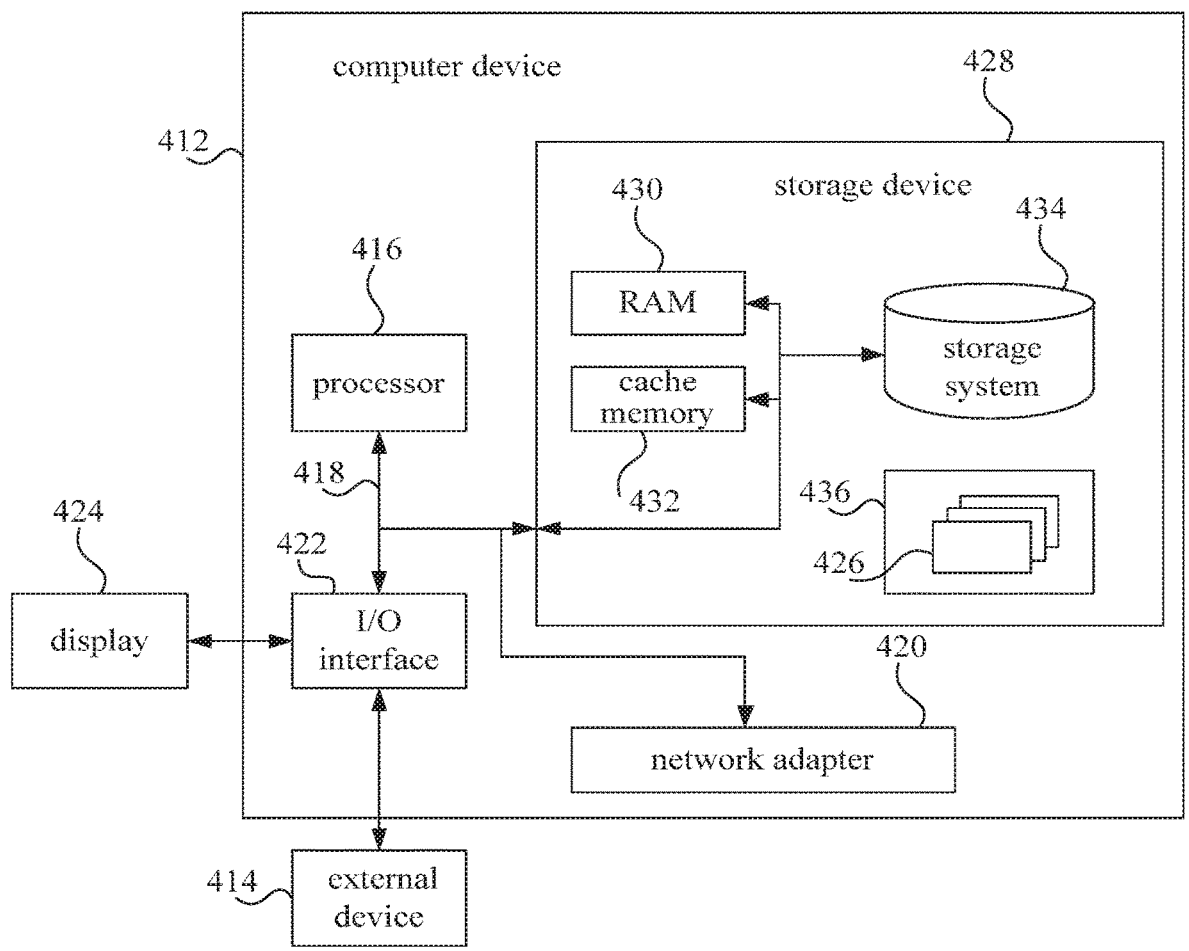
FIG. 4 is a block diagram illustrating a computer device provided in Embodiment 4 of the present disclosure.

FIG. 4 is a block diagram illustrating a computer device provided in Embodiment 4 of the present disclosure. FIG. 4 illustrates a block diagram of a computer device 412 applicable to implement embodiments of the present disclosure. The computer device 412 illustrated in FIG. 4 is only an example, which may not bring any limitation to functions and scope of embodiments of the present disclosure. The computer device 412 is typically a computing device carrying a function of a node of a blockchain system.

As illustrated in FIG. 4, the computer device 412 is presented in form of a general-purpose computing device. Components of the computer device 412 may include but be not limited to: one or more processors or processing units 416, a storage device 428, and a bus 418 connecting different system components (including the storage device 428 and the processing unit 416).

The bus 418 represents one or more of several bus structures, including a storage bus or a local bus with any bus structure in the plurality of bus structures and being employed by a storage controller, a peripheral bus, an accelerated graphics port and a processor. For example, these architectures include but are not limited to an industry standard architecture (ISA) bus, a micro channel architecture (MCA) bus, an enhanced ISA bus, a video electronics standards association (VESA) local bus and a peripheral component interconnection (PCI) bus.

The computer device 412 typically includes a plurality of computer system readable mediums. These mediums may be any usable medium that may be accessed by the computer device 412, including volatile and non-volatile mediums, removable and non-removable mediums.

The storage device 428 may include computer system readable mediums in the form of volatile medium, such as a random-access memory (RAM) 430 and/or a cache memory 432. The computer device 412 may further include other removable/non-removable, volatile/non-volatile computer system storage mediums. Only as an example, the storage system 434 may be configured to read from and write to non-removable, non-volatile magnetic mediums (not illustrated in FIG. 4, and usually called "a hard disk driver"). Although not illustrated in FIG. 4, a magnetic disk driver configured to read from and write to the removable non-volatile magnetic disc (such as "a diskette"), and an optical disc driver configured to read from and write to a removable non-volatile optical disc (such as a compact disc-read only memory (CD-ROM), a digital video disc-read only memory (DVD-ROM) or other optical mediums) may be provided. Under these circumstances, each driver may be connected to the bus 418 by one or more data medium interfaces. The storage 428 may include at least one program product. The program product has a set of program modules (such as, at least one program module), and these program modules are configured to execute functions of respective embodiments of the present disclosure.

A program 436, having a set (at least one) of program modules 426, may be stored in the storage 428. Such program modules 426 include but are not limited to an operating system, one or more application programs, other program modules, and program data. Each or any combination of these examples may include an implementation of a networking environment. The program module 426 usually executes functions and/or methods described in embodiments of the present disclosure.

The computer device 412 may also communicate with one or more external devices 414 (such as a keyboard, a pointing device, and a display 424), may also communicate with one or more devices enabling a user to interact with the computer device 412, and/or may communicate with any device (such as a network card, and a modem) enabling the computer device 412 to communicate with one or more other computing devices. Such communication may occur via an input/output (I/O) interface 422. Moreover, the computer device 412 may further communicate with one or more networks (such as local area network (LAN), wide area network (WAN) and/or public network, such as Internet) via a network adapter 420. As illustrated in FIG. 4, the network adapter 420 communicates with other modules of the computer device 412 via the bus 418. It should be understood that, although not illustrated in FIG. 4, other hardware and/or software modules may be used in combination with the computer device 412, including but being not limited to: microcode, device drivers, redundant processing units, external disk drive arrays, RAID (redundant array of independent disks) systems, tape drives, and data backup storage systems, etc.

The processor 416, by operating programs stored in the storage device 428, executes various function applications and data processing, for example implements a method for processing an account of a blockchain network provided in embodiments of the present disclosure.

That is, the processing unit is configured to execute the program to execute: obtaining an account transaction request associated with a chain account, in which, the chain account belongs to the blockchain; obtaining an account smart contract from the account transaction request, and writing the account smart contract into a block, in which, the account smart contract is configured to perform operation on a chain element in the chain account when executed.

With the computer device, the account transaction request associated with the chain account is obtained, the account smart contract is obtained from the account transaction request, and the account smart contract is written into the block, such that the block generation node may process the chain account based on a rule stipulated in the account smart contract when executing the account smart contract, in which, the chain account belongs to the blockchain. The chain account is operated based on the rule stipulated in the account smart contract without depending on the operation of the user on the chain account, thereby providing a way for the blockchain technology and the account function to adapt to the requirements of respective scenes, and enabling the blockchain network and the account function of the blockchain to match the requirements of the more complex application scenes.

Embodiment 5

Embodiment 5 of the present disclosure also provides a computer readable storage medium having a computer program stored thereon. The computer program is configured to implement the method for processing the account of the blockchain network according to any of embodiments of the present disclosure when executed by a computer processor. The method includes: obtaining an account transaction request associated with a chain account, in which, the chain account belongs to the blockchain; obtaining an account smart contract from the account transaction request, and writing the account smart contract into a block, in which, the account smart contract is configured to perform operation on a chain element in the chain account when executed.

The computer storage medium in embodiments of the present disclosure may employ any combination of one or more computer readable mediums. The computer readable medium may be a computer readable signal medium or a computer readable storage medium. The computer readable storage medium may be, but not limited to, such as, an electronic, magnetic, optical, electromagnetic, infrared, or semiconductor system, apparatus or device, or any suitable combination of the foregoing. More specific examples (a non-exhaustive list) of the computer readable storage medium may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any appropriate combination of the foregoing. In this document, the computer readable storage medium can be any tangible medium that contains or stores a program. The program can be used by or in conjunction with an instruction execution system, apparatus or device.

The computer readable signal medium may include a data signal transmitted in the baseband or as part of a carrier, in which computer readable program codes are carried. The transmitted data signal may employ a plurality of forms, including but not limited to an electromagnetic signal, a light signal or any suitable combination thereof. The computer readable signal medium may also be any computer readable medium other than the computer readable storage medium. The computer readable medium may send, propagate or transmit programs configured to be used by or in combination with an instruction execution system, apparatus or device.

The program codes included in the computer readable medium may be transmitted by any appropriate medium, including but not limited to wireless, electric wire, optical cable, RF (Radio Frequency), or any suitable combination of the foregoing.

The computer program codes for executing operations of the present disclosure may be programmed using one or more programming languages or the combination thereof. The programming languages include object-oriented programming languages, such as Java, Smalltalk, C++, and also include conventional procedural programming languages, such as the "C" programming language or similar programming languages. The program codes may be executed entirely on a user computer, partly on the user computer, as a stand-alone software package, partly on the user computer and partly on a remote computer, or entirely on the remote computer or server. In the scene involving the remote computer, the remote computer may be connected to the user computer through any type of network, including a local area network (LAN) or a wide area network (WAN), or may be connected to an external computer (for example, through the Internet using an Internet service provider).

What is claimed is:

1. A method for processing an account of a blockchain network, executed by a block generation node, comprising:
   obtaining an account transaction request associated with a chain account, wherein, the chain account is an account belonging to the blockchain and is configured to manage a medium used for a transaction in the blockchain, the account transaction request is initiated by a blockchain node and configured to request to establish the chain account, change the chain account or to perform element operation in the chain account;
   obtaining an account smart contract from the account transaction request, and writing the account smart contract into a block, wherein, the account smart contract is configured to perform operation on a chain element in the chain account when executed, the chain element is a media used for transferring in the chain account;
   wherein obtaining the account transaction request associated with the chain account comprises:
   obtaining a proposal transaction request for creating the chain account, changing the chain account, or operating the chain account; and
   in response to a set proportion of nodes in the blockchain being approval of the proposal transaction request, initiating a transaction request that identifies the chain account and the account smart contract for creating the chain account, changing the chain account, or operating the chain account;
   wherein the account smart contract is further configured to allocate a setting number of chain elements for a setting number of block generation nodes based on a hashrate contribution rule, in which the hashrate contribution rule is configured to measure a weight value of each node providing the hashrate.

2. The method of claim 1, wherein obtaining the account transaction request associated with the chain account comprises:
obtaining a transaction request of a basic chain, initiated by a node for creating a parallel chain, as the account transaction request, wherein, the transaction request of the basic chain comprises disposition data of the parallel chain needs to be created, a specified output account and the chain account bound by the parallel chain.

3. The method of claim 2, at the same time of obtaining the account smart contract from the account transaction request and writing the account smart contract into the block, further comprising:
executing the account smart contract, and transferring a basic chain element in the specified output account into the chain account.

4. The method of claim 3, wherein the account smart contract is configured to perform the operation on the chain element in the chain account when executed, and the operation comprises at least one of:
inputting chain elements circulating in the basic chain by other account into the chain account; and
transferring the chain elements in the chain account into other account in the blockchain based on a rule stipulated in the account smart contract.

5. The method of claim 4, wherein the rule stipulated in the account smart contract comprises:
allocating a setting number of chain elements for nodes in the blockchain network based on an average rule.

6. The method of claim 2, after obtaining the account smart contract from the account transaction request and writing the account smart contract into the block, further comprising:
executing the account smart contract, and transferring a basic chain element in the specified output account into the chain account.

7. The method of claim 2, wherein the account smart contract is configured to perform the operation on the chain element in the chain account when executed, and the operation comprises at least one of:
inputting chain elements circulating in the basic chain by other account into the chain account; and
transferring the chain elements in the chain account into other account in the blockchain based on a rule stipulated in the account smart contract.

8. The method of claim 7, wherein the rule stipulated in the account smart contract comprises:
allocating a setting number of chain elements for nodes in the blockchain network based on an average rule.

9. The method of claim 1, wherein in response to the set proportion of nodes in the blockchain being approval of the proposal transaction request, the method further comprises one of:
changing by the block generation node, the account smart contract specified in the proposal transaction request; and
generating a new account smart contract based on the proposal transaction request.

10. The method of claim 9, wherein the account smart contract is configured to perform the operation on the chain element in the chain account when executed, and the operation comprises at least one of:
inputting chain elements circulating in a basic chain by other account into the chain account; and
transferring the chain elements in the chain account into other account in the blockchain based on a rule stipulated in the account smart contract.

11. The method of claim 10, wherein the rule stipulated in the account smart contract comprises:
allocating a setting number of chain elements for nodes in the blockchain network based on an average rule.

12. The method of claim 1, wherein an address of the chain account is a natural semantic field.

13. The method of claim 12, wherein the account smart contract is configured to perform the operation on the chain element in the chain account when executed, and the operation comprises at least one of:
inputting chain elements circulating in a basic chain by other account into the chain account; and
transferring the chain elements in the chain account into other account in the blockchain based on a rule stipulated in the account smart contract.

14. The method of claim 13, wherein the rule stipulated in the account smart contract comprises:
allocating a setting number of chain elements for nodes in the blockchain network based on an average rule.

15. The method of claim 1, wherein the account smart contract is configured to perform the operation on the chain element in the chain account when executed, and the operation comprises at least one of:
inputting chain elements circulating in a basic chain by other account into the chain account; and
transferring the chain elements in the chain account into other account in the blockchain based on a rule stipulated in the account smart contract.

16. The method of claim 15, wherein the rule stipulated in the account smart contract comprises:
allocating a setting number of chain elements for nodes in the blockchain network based on an average rule.

17. An apparatus for processing an account of a blockchain network, comprising:
one or more processors;
a memory storing instructions executable by the one or more processors;
wherein the one or more processors are configured to:
obtain an account transaction request associated with a chain account, wherein, the chain account is an account belonging to the blockchain and is configured to manage a medium used for a transaction in the blockchain, the account transaction request is initiated by a blockchain node and configured to request to establish the chain account, change the chain account or to perform element operation in the chain account;
obtain an account smart contract from the account transaction request, and write the account smart contract into a block, wherein, the account smart contract is configured to perform operation on a chain element in the chain account when executed, the chain element is a media used for transferring in the chain account;
wherein the one or more processors are further configured to:
obtain a proposal transaction request for creating the chain account, changing the chain account, or operating the chain account; and
in response to a set proportion of nodes in the blockchain being approval of the proposal transaction request, initiate a transaction request that identifies the chain account and the account smart contract for creating the chain account, changing the chain account, or operating the chain account;

wherein the account smart contract is further configured to allocate a setting number of chain elements for a setting number of block generation nodes based on a hashrate contribution rule, in which the hashrate contribution rule is configured to measure a weight value of each node providing the hashrate.

18. A non-transitory computer readable medium having a computer program stored thereon, wherein when the computer program is executed by a processor, the processors is caused to implement a method for processing an account of a blockchain network, and the method comprises:

obtaining an account transaction request associated with a chain account, wherein, the chain account is an account belonging to the blockchain and is configured to manage a medium used for a transaction in the blockchain, the account transaction request is initiated by a blockchain node and configured to request to establish the chain account, change the chain account or to perform element operation in the chain account;

obtaining an account smart contract from the account transaction request, and writing the account smart contract into a block, wherein, the account smart contract is configured to perform operation on a chain element in the chain account when executed, the chain element is a media used for transferring in the chain account;

wherein obtaining the account transaction request associated with the chain account comprises:

obtaining a proposal transaction request for creating the chain account, changing the chain account, or operating the chain account; and in response to a vote result of other nodes of the blockchain being approval of the proposal transaction request, initiating a transaction request that identifies the chain account and the account smart contract for creating the chain account, changing the chain account, or operating the chain account;

wherein the account smart contract is further configured to allocate a setting number of chain elements for a setting number of block generation nodes based on a hashrate contribution rule, in which the hashrate contribution rule is configured to measure a weight value of each node providing the hashrate.

\* \* \* \* \*